United States Patent
Onoue et al.

(10) Patent No.: US 12,094,656 B2
(45) Date of Patent: Sep. 17, 2024

(54) MULTILAYER CAPACITOR HAVING INTERNAL ELECTRODES AND EXTERNAL ELECTRODES

(71) Applicant: TDK CORPORATION, Tokyo (JP)

(72) Inventors: Toru Onoue, Tokyo (JP); Kohei Sumiya, Tokyo (JP); Masahiro Iwama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 117 days.

(21) Appl. No.: 17/902,298

(22) Filed: Sep. 2, 2022

(65) Prior Publication Data
US 2023/0290571 A1  Sep. 14, 2023

(30) Foreign Application Priority Data

Mar. 14, 2022  (JP) ................. 2022-039119

(51) Int. Cl.
*H01G 4/012* (2006.01)
*H01G 4/232* (2006.01)
*H01G 4/30* (2006.01)

(52) U.S. Cl.
CPC ............. *H01G 4/012* (2013.01); *H01G 4/232* (2013.01); *H01G 4/30* (2013.01)

(58) Field of Classification Search
CPC ......... H01G 4/232; H01G 4/30; H01G 4/1227
See application file for complete search history.

(56) References Cited

U.S. PATENT DOCUMENTS

| | | | |
|---|---|---|---|
| 2006/0245141 A1* | 11/2006 | Shirasu | H01G 4/012 361/303 |
| 2016/0189867 A1* | 6/2016 | Zaima | H01G 4/012 361/301.4 |
| 2017/0334230 A1* | 11/2017 | Sawada | H01G 4/30 |
| 2018/0286583 A1* | 10/2018 | Onoue | H01G 4/012 |
| 2020/0303124 A1* | 9/2020 | Masunari | H01G 4/224 |
| 2021/0335541 A1* | 10/2021 | Ikeda | H01G 4/30 |
| 2022/0093340 A1* | 3/2022 | Matsui | H01G 4/30 |
| 2022/0246355 A1* | 8/2022 | Tahara | H01G 4/232 |

FOREIGN PATENT DOCUMENTS

JP  2001-102243 A  4/2001

* cited by examiner

*Primary Examiner* — David M Sinclair
*Assistant Examiner* — Daniel M Dubuisson
(74) *Attorney, Agent, or Firm* — Oliff PLC

(57) ABSTRACT

In a multilayer capacitor, when a width of a element body in a facing direction of a pair of side surfaces is W, and a distance from a start position of a curved shape of the element body on the side surface side in a plane of a first internal electrode of an outermost layer to a virtual surface including the side surface when viewed from the facing direction of a pair of end surfaces is Rw, We/4≤X<W−2×Rw is satisfied.

5 Claims, 12 Drawing Sheets

Fig.10A

| | ELEMENT BODY L [μm] | ELEMENT BODY W [μm] | ELEMENT BODY T [μm] | X [μm] | Rw [μm] | Rt [μm] | We [μm] | Tg [μm] | We/4 [μm] | W-2*Rw [μm] |
|---|---|---|---|---|---|---|---|---|---|---|
| EXAMPLE 1 | 980 | 630 | 430 | 215 | 90 | 45 | 430 | 70 | 108 | 450 |
| EXAMPLE 2 | 1650 | 880 | 850 | 175 | 100 | 45 | 700 | 100 | 175 | 680 |
| EXAMPLE 3 | 1650 | 880 | 850 | 350 | 100 | 50 | 700 | 100 | 175 | 680 |
| EXAMPLE 4 | 1650 | 880 | 850 | 525 | 100 | 75 | 700 | 100 | 175 | 680 |
| EXAMPLE 5 | 2010 | 1360 | 860 | 555 | 120 | 60 | 1110 | 85 | 278 | 1120 |
| EXAMPLE 6 | 3100 | 1560 | 1250 | 590 | 180 | 100 | 1180 | 180 | 295 | 1200 |
| COMPARATIVE EXAMPLE 1 | 1650 | 880 | 850 | 70 | 100 | 40 | 700 | 100 | 175 | 680 |
| COMPARATIVE EXAMPLE 2 | 1650 | 880 | 850 | 700 | 100 | 110 | 700 | 100 | 175 | 680 |

Fig.10B

| | THICKNESS OF CONNECTION PART [μm] | NUMBER OF INTERNAL ELECTRODE [PIECE] | AREA OF CONNECTION PART [mm2] | AREA OF END SURFACE [mm2] | AREA OF CONNECTION PART/AREA OF END SURFACE | Rdc [mΩ] | | RELIABILITY |
|---|---|---|---|---|---|---|---|---|
| EXAMPLE 1 | 0.85 | 111 | 0.020 | 0.271 | 0.075 | 5.0 | ○ | ○ |
| EXAMPLE 2 | 0.85 | 232 | 0.035 | 0.748 | 0.046 | 4.7 | ○ | ○ |
| EXAMPLE 3 | 0.85 | 232 | 0.069 | 0.748 | 0.092 | 3.9 | ○ | ○ |
| EXAMPLE 4 | 0.85 | 232 | 0.104 | 0.748 | 0.138 | 3.5 | ○ | ○ |
| EXAMPLE 5 | 0.85 | 311 | 0.147 | 1.170 | 0.125 | 1.7 | ○ | ○ |
| EXAMPLE 6 | 0.85 | 319 | 0.160 | 1.950 | 0.082 | 2.5 | ○ | ○ |
| COMPARATIVE EXAMPLE 1 | 0.85 | 232 | 0.014 | 0.748 | 0.018 | 8.6 | × | ○ |
| COMPARATIVE EXAMPLE 2 | 0.85 | 232 | 0.138 | 0.748 | 0.185 | 3.4 | ○ | × |

MULTILAYER CAPACITOR HAVING INTERNAL ELECTRODES AND EXTERNAL ELECTRODES

TECHNICAL FIELD

The present disclosure relates to multilayer capacitors.

BACKGROUND

As a conventional multilayer capacitor, for example, there is a feed-through capacitor described in Japanese Unexamined Patent Publication No. 2001-102243. The conventional feed-through capacitor is a so-called three-terminal type multilayer ceramic capacitor. In the feed-through capacitor, a feed-through conductor layer and a ground electrode layer are alternately disposed inside a laminate formed by laminating a plurality of dielectric layers. The feed-through conductor layer is led out to a pair of first end surfaces facing each other. The ground electrode layer faces the feed-through conductor layer with a dielectric layer interposed therebetween and is led out to the other pair of second end surfaces of the laminate facing each other. A pair of input/output terminals connected to both end portions of the feed-through conductor layer are formed on the pair of first end surfaces. Ground terminals connected to both end portions of the ground electrode layer are formed on the pair of second end surfaces.

SUMMARY

In the multilayer capacitor as described above, a connection part having a smaller width than a main electrode part is provided when an internal electrode is drawn out to a surface of an element body. However, it is conceivable that a DC resistance will increase depending on a configuration of the connection part. If a DC resistance increases, self-heating at the time of use increases, and there is a likelihood that a service life of the product will decrease. Also, there are cases in which a corner portion and a ridge line portion of the element body in which internal electrodes are disposed have curved shapes (chamfered shapes or rounded shapes). When a connection part comes into contact with a portion of the curved shape, it is conceivable that reliability will decrease due to an insufficient length of the connection part and an insufficient thickness of an external electrode at the portion of the curved shape.

The present disclosure has been made to solve the above-described problems, and an objective of the present invention is to provide a multilayer capacitor capable of suppressing an increase in DC resistance and securing sufficient reliability.

A multilayer capacitor according to one aspect of the present disclosure includes an element body including a pair of end surfaces facing each other, and a pair of side surfaces and a pair of main surfaces extending in a facing direction of the pair of end surfaces between the pair of end surfaces, a plurality of first internal electrodes disposed in a facing direction of the pair of main surfaces in the element body and extending in the facing direction of the pair of end surfaces, a plurality of second internal electrodes disposed in the facing direction of the pair of main surfaces in the element body and extending in a facing direction of the pair of side surfaces, a pair of first external electrodes disposed on the pair of end surfaces, and a pair of second external electrodes disposed apart from the first external electrodes on the pair of side surfaces, in which a ridge line portion of the element body which defines each of the pair of end surfaces has a curved shape, the first internal electrodes each include a main electrode part which overlaps each of the second internal electrodes when viewed from the facing direction of the pair of main surfaces, and a connection part which is drawn out from the main electrode part to each of the pair of end surfaces with a width X smaller than a width We of the main electrode part to be connected to each of the first external electrodes, and when a width of the element body in the facing direction of the pair of side surfaces is W, and a distance from a start position of a curved shape of the element body on the side surface side in a plane of the first internal electrode of an outermost layer to a virtual surface including the side surface when viewed from the facing direction of the pair of end surfaces is Rw, We/4≤X<W−2×Rw is satisfied.

In the multilayer capacitor, when We/4≤X is satisfied, a width of the connection part in the first internal electrode is secured to be a certain value or more with respect to the main electrode part and an increase in DC resistance can be suppressed. When the increase in DC resistance is suppressed, self-heating at the time of use can be suppressed and decrease in service life of the product can be suppressed. Also, in the multilayer capacitor 1, when X<W−2×Rw is satisfied, the connection part can be prevented from coining into contact with the ridge line portion of the end surface of the curved element body on the side surface side. Thereby, the connection part is not scraped off at the ridge line portion, and decrease in reliability due to an insufficient length of the connection part can be suppressed.

The multilayer capacitor may satisfy 175 μm≤X. In this case, an increase in DC resistance can be more reliably suppressed.

The multilayer capacitor may have a chip size of a 1608 size. According to the present disclosure, an increase in DC resistance can be suitably suppressed and sufficient reliability can be secured in the multilayer capacitor of the 1608 size.

When viewed from the facing direction of the pair of end surfaces, when a distance from a start position of a curved shape of the element body on the main surface side in a plane including edge portions in a width direction of the connection part in the first internal electrode of the outermost layer and perpendicular to the first internal electrode to a virtual surface including the main surface is Rt, and a distance between the first internal electrode of the outermost layer and the main surface is Tg, Tg>Rt may be satisfied. In this case, when Tg>Rt is satisfied, the connection part can be prevented from coining into contact with the ridge line portion of the end surface of the curved element body on the main surface side. Thereby, decrease in reliability due to an insufficient thickness of the first external electrode 3 at a portion of the curved shape can be suppressed.

When an area of the end surface including the curved shape is 1, a total area of the connection parts of the plurality of first internal electrodes exposed on the end surface may be 0.046 or more. Thereby, a sufficient contact area between the first internal electrode and the first external electrode can be secured, and peeling of the first external electrode from the end surface of the element body can be prevented. Thereby, an increase in DC resistance can be suppressed.

In the first internal electrode, a thickness Eg of the connection part may be larger than a thickness Ec of the main electrode part. Thereby, an amount of displacement in the thickness direction between the main electrode part and the connection part at the time of manufacturing the multilayer capacitor can be reduced, and adhesion of the first internal electrode and the element body can be enhanced. Also, a sufficient contact area between the first internal electrode and the first external electrode can be secured, and peeling of the first external electrode from the end surface of the element body can be prevented. Thereby, an increase in DC resistance can be suppressed.

BRIEF DESCRIPTION OF THE DRAWINGS

FIG. 10A is a diagram showing evaluation test results of a DC resistance and reliability in examples and comparative examples.

FIG. 10B is a diagram showing evaluation test results of a DC resistance and reliability in examples and comparative examples.

DETAILED DESCRIPTION

Hereinafter, a preferred embodiment of a multilayer capacitor according to one aspect of the present disclosure will be described in detail with reference to the drawings.

Figure 1:
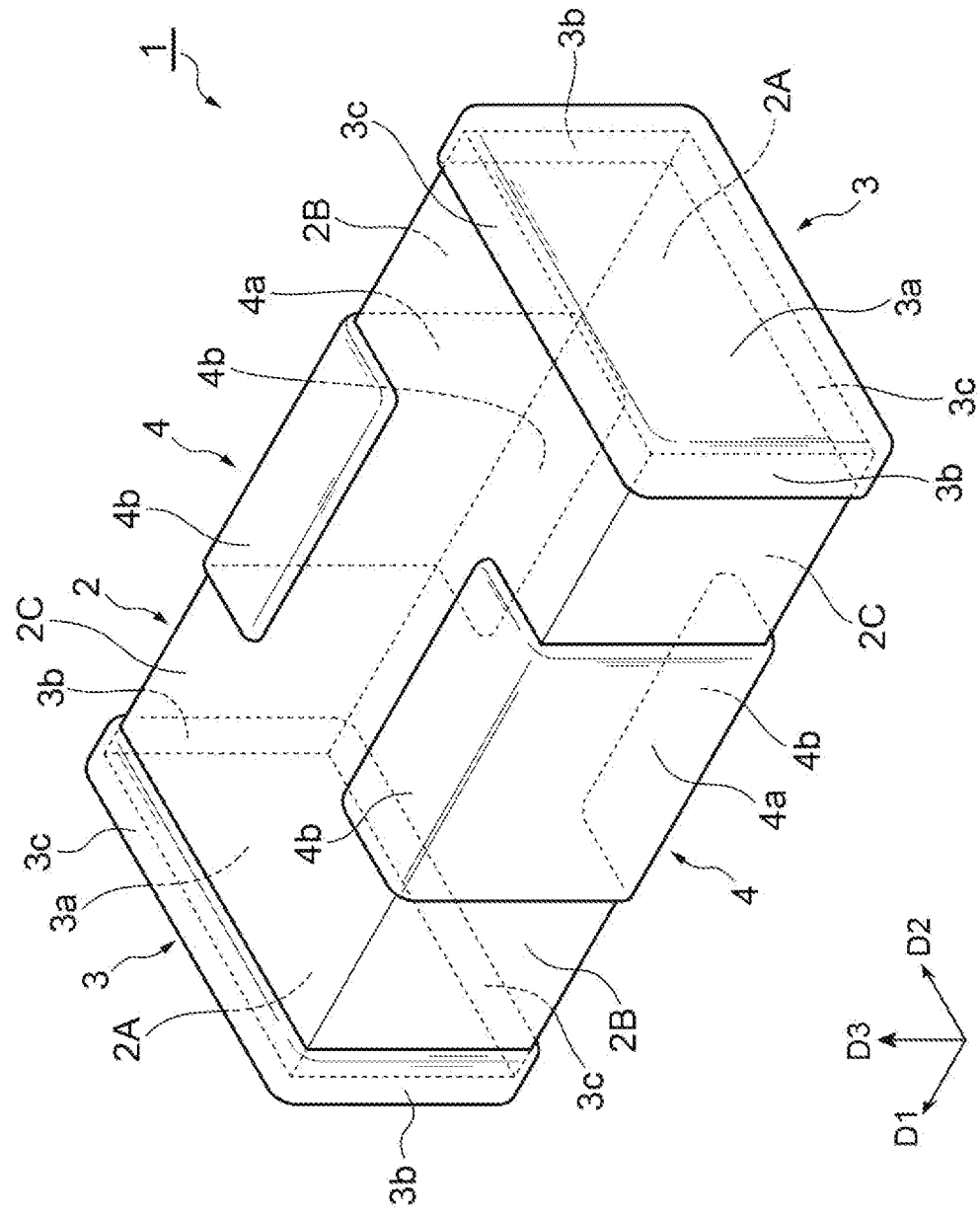
FIG. 1 is a schematic perspective view of a multilayer capacitor according to one embodiment of the present disclosure.

FIG. 1 is a schematic perspective view of a multilayer capacitor according to one embodiment of the present disclosure. As illustrated in FIG. 1, a multilayer capacitor 1 according to the present embodiment is configured as a so-called three-terminal type feed-through capacitor. The multilayer capacitor 1 can be mounted on, for example, a circuit board of an electronic device. A chip size of the multilayer capacitor 1 is, for example, a 1608 size (length 1.6 mm×width 0.8 mm×height 0.8 mm) A chip size of the multilayer capacitor 1 is not particularly limited, and may have a size other than the 1608 size.

As illustrated in FIG. 1, the multilayer capacitor 1 includes an element body 2, a pair of first external electrodes 3 and 3, and a pair of second external electrodes 4 and 4. The pair of first external electrodes 3 and 3 are electrodes that function as external electrodes for signals. The pair of second external electrodes 4 and 4 are electrodes that function as external electrodes for grounding.

The element body 2 is formed by laminating a plurality of dielectric layers. The dielectric layers are each formed of a sintered body of a ceramic green sheet containing, for example, a dielectric material (a $BaTiO_3$-based dielectric ceramic, a $Ba(Ti, Zr)O_3$-based dielectric ceramic, a $(Ba,$ $Ca)TiO_3$-based dielectric ceramic, or the like). In an actual element body 2, the dielectric layers are integrated to such an extent that boundaries therebetween cannot be visually recognized. A shape of the element body 2 is a substantially rectangular parallelepiped shape. A corner portion and a ridge line portion of the element body 2 have curved shapes. Specifically, the corner portion and ridge line portion of the element body 2 have chamfered shapes or rounded shapes (also referred to as R shapes).

The element body 2 has a pair of end surfaces 2A and 2A facing each other, a pair of side surfaces 2B and 2B facing each other, and a pair of main surfaces 2C and 2C facing each other. The pair of side surfaces 2B and 2B and the pair of main surfaces 2C and 2C extend in a facing direction of the pair of end surfaces 2A and 2A between the pair of end surfaces 2A and 2A. The pair of end surfaces 2A and 2A, the pair of side surfaces 2B and 2B, and the pair of main surfaces 2C and 2C are in a state of being perpendicular to each other. One of the pair of main surfaces 2C and 2C is a mounting surface (a surface facing a circuit board or the like) when the multilayer capacitor 1 is mounted on the circuit board or the like of an electronic device.

In the multilayer capacitor 1, as described above, the corner portion and ridge line portion of the element body 2 have curved shapes. That is, in the multilayer capacitor 1, ridge line portions of the element body 2 that define the pair of end surfaces 2A and 2A, ridge line portions of the element body 2 that define the pair of side surfaces 2B and 2B, and ridge line portions of the element body 2 that define the pair of main surfaces 2C and 2C have chamfered shapes or rounded shapes.

Here, a facing direction of the pair of end surfaces 2A and 2A is referred to as D1, a facing direction of the pair of side surfaces 2B and 2B is referred to as D2, and a facing direction of the pair of main surfaces 2C and 2C is referred to as D3. The facing direction D1 of the pair of end surfaces 2A and 2A corresponds to a length direction of the element body 2. The facing direction D2 of the pair of side surfaces 2B and 2B corresponds to a width direction of the element body 2. The facing direction D3 of the pair of main surfaces 2C and 2C corresponds to a height direction of the element body 2. The facing direction D3 of the pair of main surfaces 2C and 2C coincides with a lamination direction of the plurality of dielectric layers forming the element body 2.

The pair of first external electrodes 3 and 3 are provided on the pair of end surfaces 2A and 2A. The first external electrode 3 includes a main body part 3a that covers the entirety of the end surface 2A, wraparound parts 3b and 3b that wrap around edge portions of the pair of side surfaces 2B and 2B from the main body part 3a, and wraparound parts 3c and 3c that wrap around edge portions of the pair of main surfaces 2C and 2C from the main body part 3a.

The first external electrode 3 is formed on the end surface 2A to cover a lead-out portion (connection part 6b to be described later) of a first internal electrode 6. The first external electrode 3 may be formed to include a sintered layer covering the lead-out portion and a plated layer covering the sintered layer. The sintered layer may contain a metal or glass. The metal may be Cu, Ni, Ag, or the like. The plated layer may be either a single layer or multiple layers. When the plated layer is a multilayer, a Ni plated layer, a Sn layer covering the Ni plated layer, and the like may be included. In the present embodiment, the first external electrode 3 has a three-layer structure constituted by a Cu sintered layer 3A, a Ni plated layer 3B, and a Sn plated layer 3C (see FIG. 2 or the like).

The pair of second external electrodes 4 and 4 are provided at central portions in the length direction of the element body 2 on the pair of side surfaces 2B and 2B. The second external electrode 4 includes a main body part 4a extending in the height direction of the element body 2 with a predetermined width on the side surface 2B, and wrap-around parts 4b and 4b that wrap around edge portions of the pair of main surfaces 2C and 2C from the main body part 4a.

The second external electrode 4 is formed on the side surface 2B to cover a lead-out portion (connection part 7b to be described later) of a second internal electrode 7. Similarly to the first external electrode 3, the second external electrode 4 may be formed to include a sintered layer covering the lead-out portion and a plated layer covering the sintered layer. The sintered layer may contain a metal or glass. The metal may be Cu, Ni, Ag, or the like. The plated layer may be either a single layer or a multilayer. When the plated layer is a multilayer, a Ni plated layer, a Sn layer covering the Ni plated layer, and the like may be included. In the present embodiment, the second external electrode 4 has a three-layer structure constituted by a Cu sintered layer 4A, a Ni plated layer 4B, and a Sn plated layer 4C (see FIG. 3 or the like).

Figure 2:
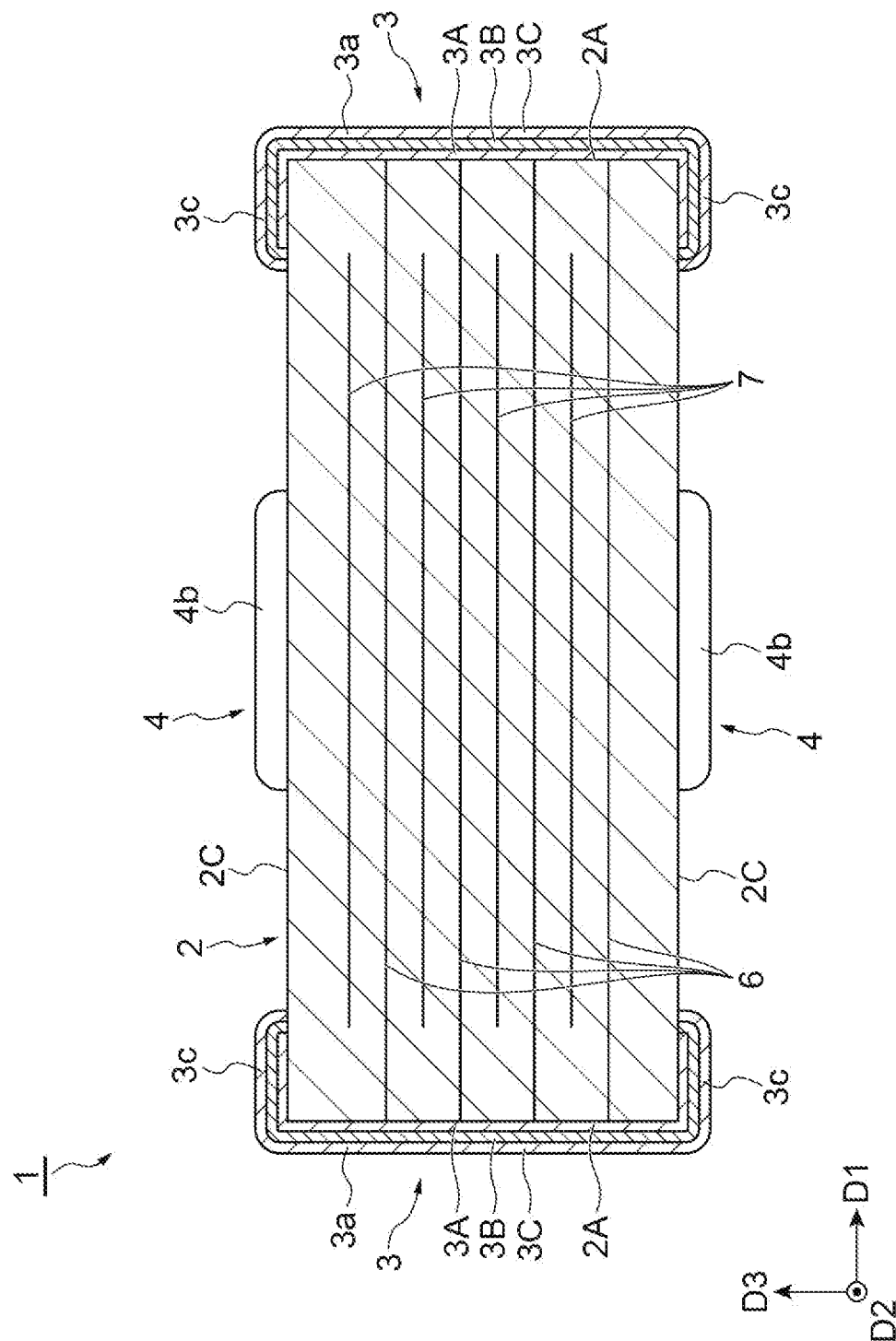
FIG. 2 is a cross-sectional view between a pair of end surfaces of the multilayer capacitor.
Figure 3:
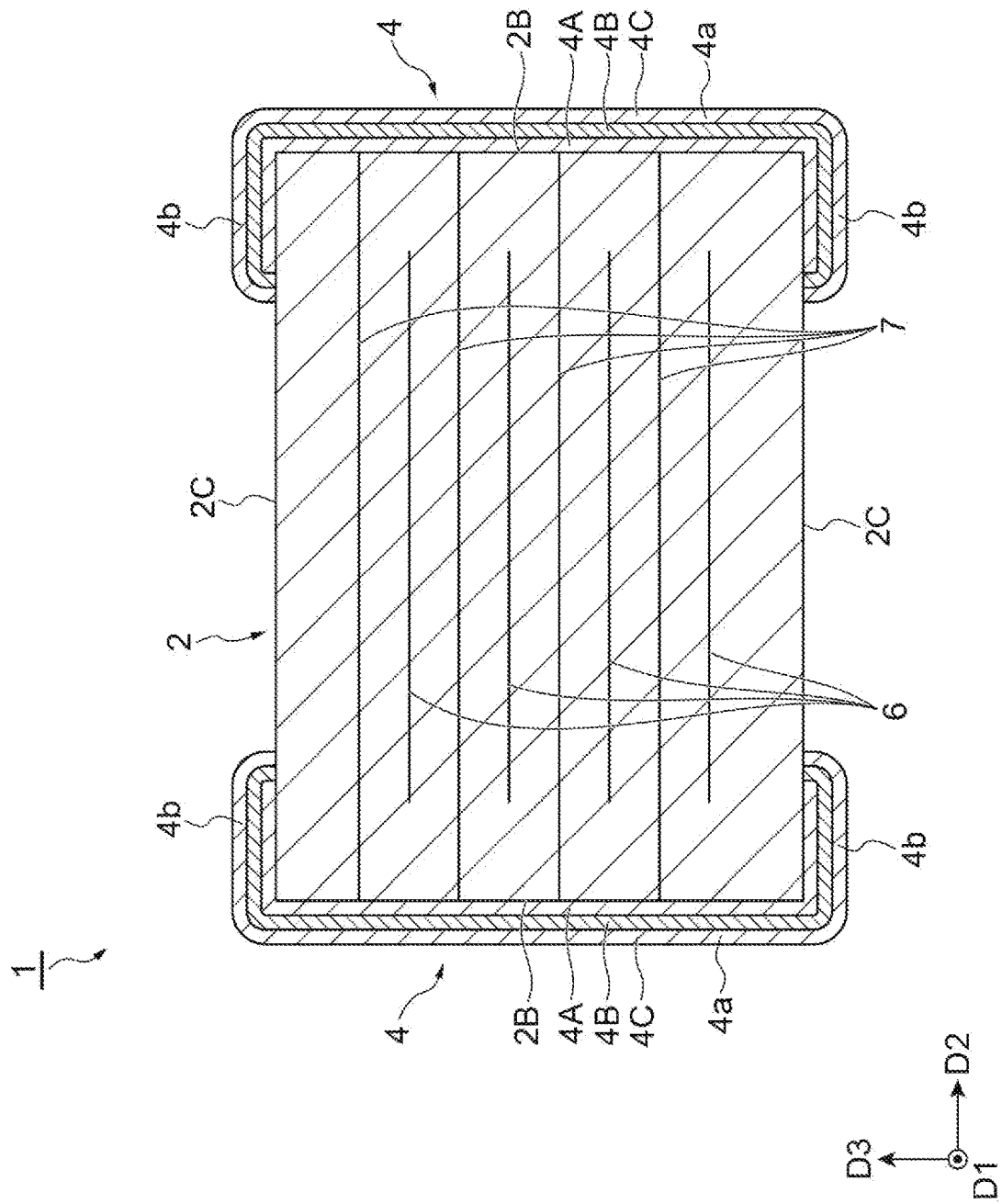
FIG. 3 is a cross-sectional view between a pair of side surfaces of the multilayer capacitor.

As illustrated in FIGS. 2 to 5, a plurality of first internal electrodes 6 and a plurality of second internal electrodes 7 are disposed in the element body 2. As a constituent material of the first internal electrode 6 and the second internal electrode 7, a conductive material (for example, Ni, Cu, or the like) generally used as an internal electrode of a lamination-type electric element can be exemplified. The first internal electrode 6 and the second internal electrode 7 are formed as a sintered body of a conductive paste containing the above-described conductive material. As illustrated in FIGS. 2 and 3, the plurality of first internal electrodes 6 and the plurality of second internal electrodes 7 are alternately laminated with a dielectric layer interposed therebetween in the facing direction D3 of the pair of main surfaces 2C and 2C.

Figure 4:
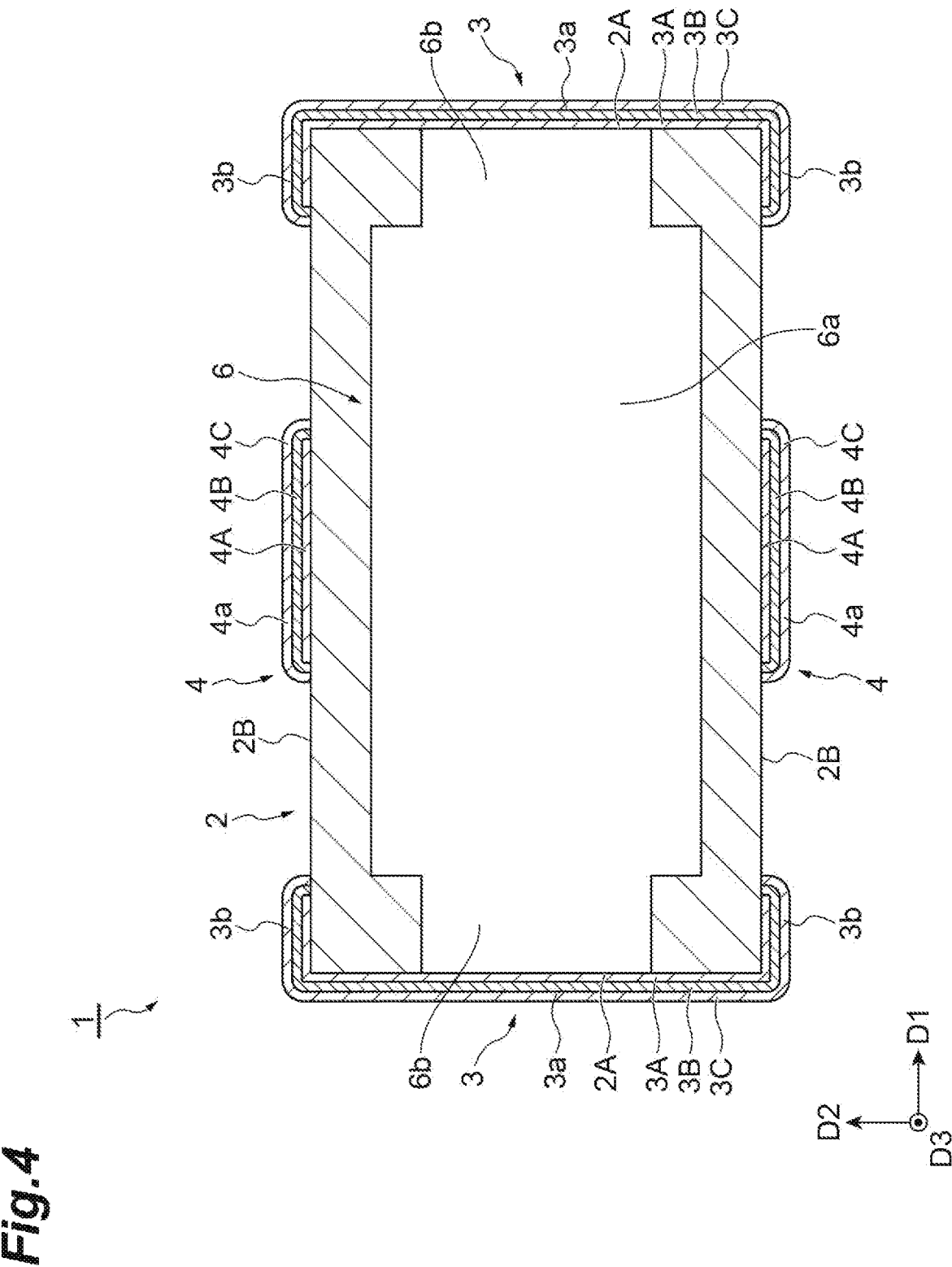
FIG. 4 is a cross-sectional view of the multilayer capacitor in a plane of a first internal electrode.

As illustrated in FIG. 4, the first internal electrode 6 includes a main electrode part 6a and connection parts 6b. The main electrode part 6a has a rectangular shape in a plan view. A long side of the main electrode part 6a extends in the facing direction D1 of the pair of end surfaces 2A and 2A. A short side of the main electrode part 6a extends in the facing direction D2 of the pair of side surfaces 2B and 2B. The connection parts 6b protrude in band shapes from central portions of the short sides of the main electrode part 6a and extend to the pair of end surfaces 2A and 2A. Thereby, the first internal electrode 6 is electrically connected to the first external electrodes 3 and 3 on the pair of end surfaces 2A and 2A. A width of each of the connection parts 6b is smaller than, for example, the short side of the main electrode part 6a.

Figure 5:
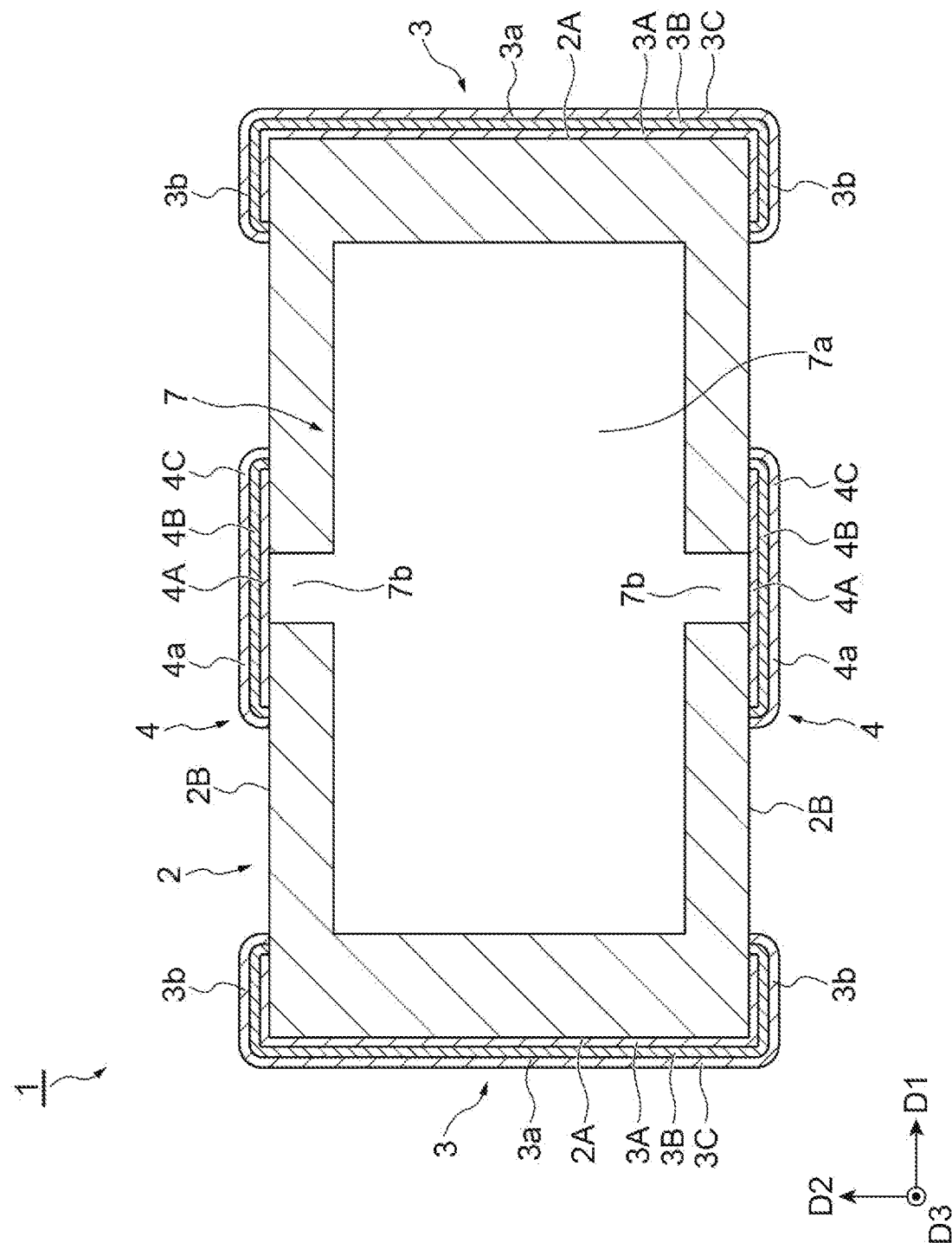
FIG. 5 is a cross-sectional view of the multilayer capacitor in a plane of a second internal electrode.

As illustrated in FIG. 5, the second internal electrode 7 includes a main electrode part 7a and connection parts 7b. The main electrode part 7a has a rectangular shape in a plan view. A long side of the main electrode part 7a extends in the facing direction D1 of the pair of end surfaces 2A and 2A. A short side of the main electrode part 7a extends in the facing direction D2 of the pair of side surfaces 2B and 2B. The main electrode part 7a is positioned to overlap the main electrode part 6a of the first internal electrode 6 when viewed from the facing direction D3 of the pair of main surfaces 2C and 2C. The connection parts 7b protrude in band shapes from central portions of the long sides of the main electrode part 7a and extend to the pair of side surfaces 2B and 2B. Thereby, the second internal electrode 7 is electrically connected to the second external electrodes 4 and 4 on the pair of side surfaces 2B and 2B. A width of each of the connection parts 7b is smaller than, for example, the width of the connection part 6b of the first internal electrode 6.

Next, a dimensional relationship between the element body 2 and the first internal electrode 6 in the multilayer capacitor 1 described above will be described with reference to FIGS. 6 and 7.

Figure 6:
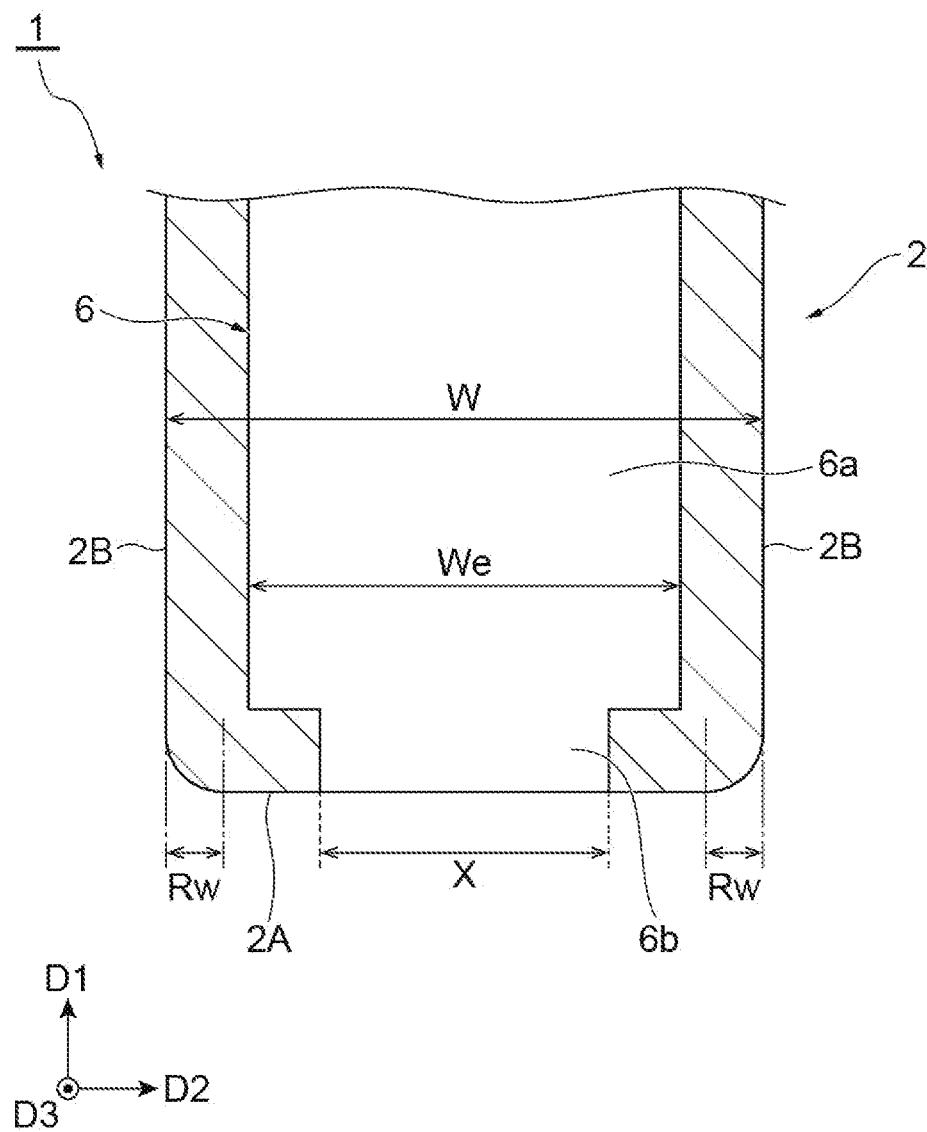
FIG. 6 is a cross-sectional view of the multilayer capacitor in a plane of the first internal electrode.
Figure 7:
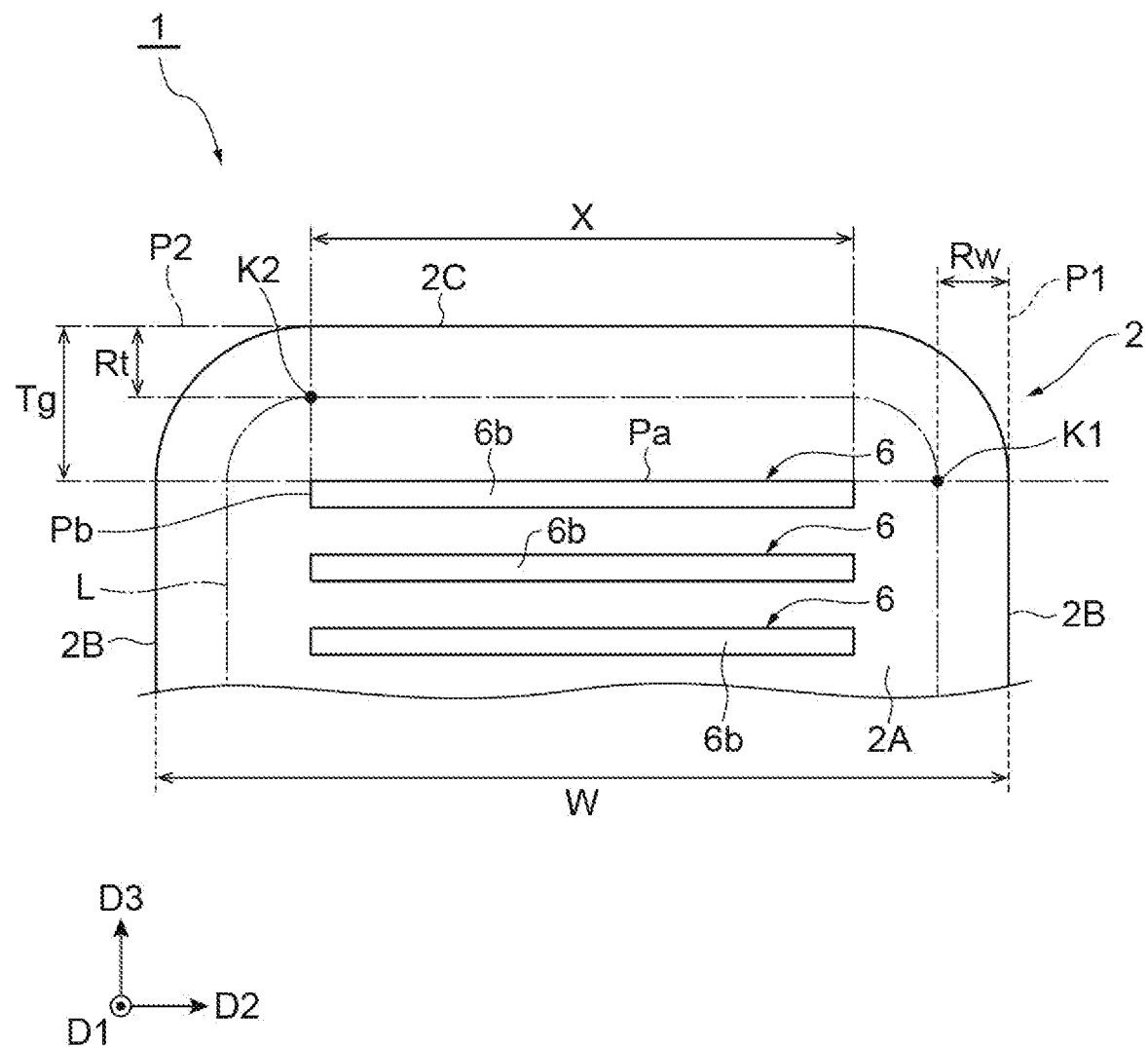
FIG. 7 is an enlarged view of a main part illustrating an end surface of an element body.

FIG. 6 is a cross-sectional view of the multilayer capacitor in a plane of the first internal electrode. FIG. 7 is an enlarged view of a main part illustrating the end surface of the element body. FIGS. 6 and 7 illustrate one side of the end surfaces 2A and 2A, but the other side of the end surfaces 2A and 2A has the same configuration. Also, in FIGS. 6 and 7, illustration of the first external electrode 3 is omitted.

As illustrated in FIG. 6, in the multilayer capacitor 1, a width of the element body 2 in the facing direction D2 of the pair of side surfaces 2B and 2B is defined as W. Also, in the first internal electrode 6, a width of the main electrode part 6a in the facing direction D2 of the pair of side surfaces 2B and 2B is defined as We, and a width of the connection part 6b in the facing direction D2 of the pair of side surfaces 2B and 2B is defined as X.

In the multilayer capacitor 1, as described above, the ridge line portions of the element body 2 that define the pair of end surfaces 2A and 2A have curved shapes. Therefore, as illustrated in FIG. 7, when the element body 2 is viewed from the facing direction D1 of the pair of end surfaces 2A and 2A, a line L at which a curved shape starts is defined on an inner side of a region defined by the side surfaces 2B and 2B and the main surfaces 2C and 2C of the element body 2. A region on an inner side of the line L is a region in which the end surface 2A is flat. A region on an outer side of the line L is a region in which the end surface 2A has a chamfered shape or a rounded shape.

In the multilayer capacitor 1, as illustrated in FIG. 7, when viewed from the facing direction D1 of the pair of end surfaces 2A and 2A, a start position of a curved shape of the element body 2 on the side surface 2B side in a plane of the first internal electrode 6 of an outermost layer is defined as K1. Then, a distance from the start position K1 to a virtual surface P1 including the side surface 2B is defined as Rw. When a surface Pa of the connection part 6b on an outer layer side (a surface facing the main surface 2C side) in the first internal electrode 6 of the outermost layer is extended in the facing direction D2 of the pair of side surfaces 2B and 2B, the start position K1 corresponds to a position at which the extended surface Pa and the line L at which the curved shape starts intersect. When a perpendicular line is drawn from the start position K1 toward the virtual surface P1 including the side surface 2B in the facing direction D2 of the pair of side surfaces 2B and 2B, Rw corresponds to a length until the perpendicular line comes into contact with the virtual surface P1 from the start position K1.

When W, We, X, and Re are defined as described above, We/4≤X<W−2×Rw is satisfied in the multilayer capacitor 1. That is, in the multilayer capacitor 1, the width X of the connection part 6b is ¼ or more of the width We of the main electrode part 6a, and the connection part 6b is disposed with a sufficient width with respect to the main electrode part 6a. The multilayer capacitor 1 has a chip size of the 1608 size, and satisfies 175 μm≤X as a dimensional example of X.

In the multilayer capacitor 1, the width X of the connection part 6b is configured to be smaller than a width obtained by subtracting a width twice the width Rw from the width W of the element body 2. In a case that X=W−2×Rw, and when it is assumed that a center position of the connection part 6*b* in the width direction coincides with a center position of the element body 2 in the width direction, there is a likelihood that the connection part 6*b* of the first internal electrode 6 of the outermost layer will come into contact with the ridge line portion of the end surface 2A of the curved element body 2 on the side surface 2B side. In the multilayer capacitor 1, since X<W−2×Rw is satisfied, the connection part 6*b* of the first internal electrode 6 of the outermost layer is in a state of not being in contact with the ridge line portion of the end surface 2A of the curved element body 2 on the side surface 2B side.

In the multilayer capacitor 1, as illustrated in FIG. 7, when viewed from the facing direction D1 of the pair of end surfaces 2A and 2A, a start position of a curved shape of the element body 2 on the main surface 2C side in a plane including edge portions in the width direction of the connection part 6*b* in the first internal electrode 6 of the outermost layer and perpendicular to the first internal electrode 6 is defined as K2. Then, a distance from the start position K2 to a virtual surface P2 including the main surface 2C is defined as Rt. Also, a distance between the first internal electrode 6 of the outermost layer and the main surface 2C is defined as Tg.

When a surface Pb of the connection part 6*b* on an edge portion side (a surface facing the side surface 2B side) in the width direction in the first internal electrode 6 of the outermost layer is extended in the facing direction D3 of the pair of main surfaces 2C and 2C, the start position K2 corresponds to a position at which the extended surface Pb and the line L at which the curved shape starts intersect. When a perpendicular line is drawn from the surface Pa on the outer layer side of the first internal electrode 6 of the outermost layer toward the main surface 2C in the facing direction D3 of the pair of main surfaces 2C and 2C, Rt corresponds to a length until the perpendicular line comes into contact with the main surface 2C from the start position K2.

When Rt and Tg are defined as described above, Tg>Rt is satisfied in the multilayer capacitor 1. In a case that Tg=Rt, and when it is assumed that a center position of the connection part 6*b* in the width direction coincides with a center position of the element body 2 in the width direction, there is a likelihood that the connection part 6*b* of the first internal electrode 6 of the outermost layer will come into contact with the ridge line portion of the end surface 2A of the curved element body 2 on the main surface 2C side. In the multilayer capacitor 1, since X<W−2×Rw is satisfied, the connection part 6*b* of the first internal electrode 6 of the outermost layer is in a state of not being in contact with the ridge line portion of the end surface 2A of the curved element body 2 on the main surface 2C side.

Figure 8:
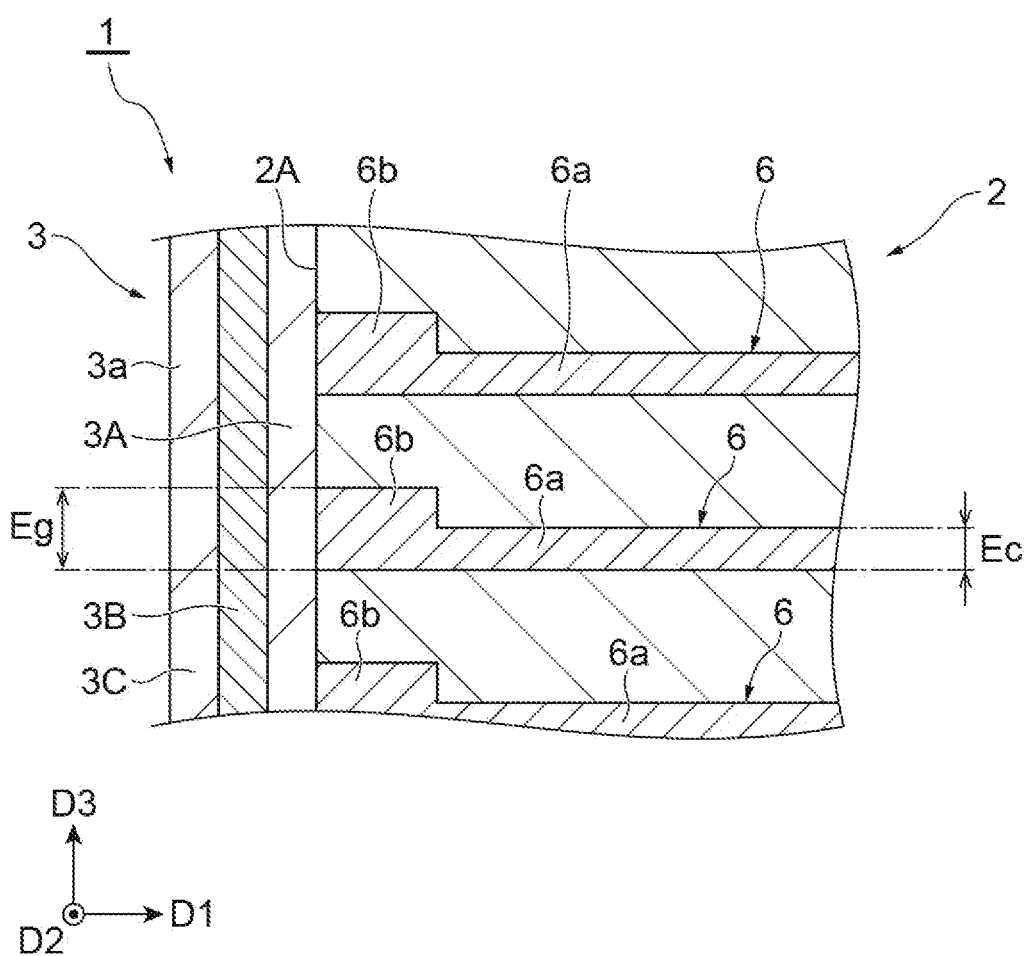
FIG. 8 is an enlarged cross-sectional view of a main part of the first internal electrode.

FIG. 8 is an enlarged cross-sectional view of a main part of the first internal electrode. As illustrated in FIG. 8, in the multilayer capacitor 1, a thickness Eg of the connection part 6*b* is larger than a thickness Ec of the main electrode part 6*a* in all the first internal electrodes 6. When the thickness of the main electrode part 6*a* is 1, the thickness Eg of the connection part 6*b* is, for example, about 1.1. The relationship between the thickness Ec of the main electrode part 6*a* and the thickness Eg of the connection part 6*b* may not be satisfied for all the first internal electrodes 6. For example, in some of the first internal electrodes 6, the thickness Eg of the connection part 6*b* may be equal to the thickness Ec of the main electrode part 6*a*.

In the multilayer capacitor 1, the first internal electrode 6 is drawn out to the end surface 2A by the connection part 6*b* having a thickness larger than that of the main electrode part 6*a*. In the multilayer capacitor 1, when an area of the end surface 2A including the curved shape is 1, a total area of the connection parts 6*b* of the plurality of first internal electrodes 6 exposed on the end surface 2A is 0.046 or more. The area of the end surface 2A including the curved shape is the entire area of the end surface 2A when viewed from the facing direction D1 of the pair of end surfaces 2A and 2A. This area corresponds to a total of an area of the inner region and an area of the outer region of the line L at which the curved shape starts.

As described above, when We/4≤X is satisfied in the multilayer capacitor 1, the width of the connection part 6*b* in the first internal electrode 6 is secured to be a certain value or more with respect to the main electrode part 6*a*. The first internal electrode 6 is drawn out to the end surface 2A with a sufficient width and is electrically connected to the first external electrode 3, and thereby an increase in DC resistance is suppressed. When the increase in DC resistance is suppressed, self-heating at the time of use can be suppressed and decrease in service life of the product can be suppressed. Also, in the multilayer capacitor 1, when X<W−2×Rw is satisfied, the connection part 6*b* can be prevented from coining into contact with the ridge line portion of the end surface 2A of the curved element body 2 on the side surface 2B side. Thereby, the connection part 6*b* is not scraped off at the ridge line portion, and decrease in reliability due to an insufficient length of the connection part 6*b* can be suppressed. Also, decrease in reliability due to entering of a plating solution at the time of forming the first external electrode 3 can be prevented.

In the multilayer capacitor 1, when 175 μm≤X is satisfied, the width of the connection part 6*b* in the first internal electrode 6 is secured to be a certain value or more with respect to the main electrode part 6*a*, and an increase in DC resistance can be more reliably suppressed. Also, a chip size of the multilayer capacitor 1 is the 1608 size, and thus the increase in DC resistance can be suitably suppressed and sufficient reliability can be secured in the multilayer capacitor 1 of the same size.

In the multilayer capacitor 1, when Tg>Rt is satisfied, the connection part 6*b* can be prevented from coining into contact with the ridge line portion of the end surface 2A of the curved element body 2 on the main surface 2C side. Thereby, decrease in reliability due to an insufficient thickness of the first external electrode 3 at a portion of the curved shape can be suppressed.

In the multilayer capacitor 1, when an area of the end surface 2A including the curved shape is 1, a total area of the connection parts 6*b* of the plurality of first internal electrodes 6 exposed on the end surface 2A is 0.046 or more. Thereby, a sufficient contact area between the first internal electrode 6 and the first external electrode 3 can be secured, and peeling of the first external electrode 3 from the end surface 2A of the element body 2 can be prevented. Thereby, an increase in DC resistance can be suppressed.

In the multilayer capacitor 1, in the first internal electrode 6, the thickness Eg of the connection part 6*b* is larger than the thickness Ec of the main electrode part 6*a* in the first internal electrode 6. Thereby, an amount of displacement (drop amount) in the thickness direction between the main electrode part 6*a* and the connection part 6*b* at the time of manufacturing the multilayer capacitor 1 can be reduced, and adhesion of the first internal electrode 6 and the element body 2 can be enhanced. Also, a sufficient contact area between the first internal electrode 6 and the first external electrode 3 can be secured, and peeling of the first external electrode 3 from the end surface 2A of the element body 2 can be prevented. Thereby, an increase in DC resistance can be suppressed.

Hereinafter, examples of the present disclosure will be described. First, in the present embodiment, an evaluation test was performed on a relationship between a width of the connection part in the first internal electrode and a DC resistance. In this evaluation test, samples of five multilayer capacitors having connection parts with different widths X were prepared, and the DC resistance of each sample was measured. The width X of the connection part in each sample was ⅒We, ¼We, ½We, ¾We, and We with respect to the width We of the main electrode part.

Figure 9:
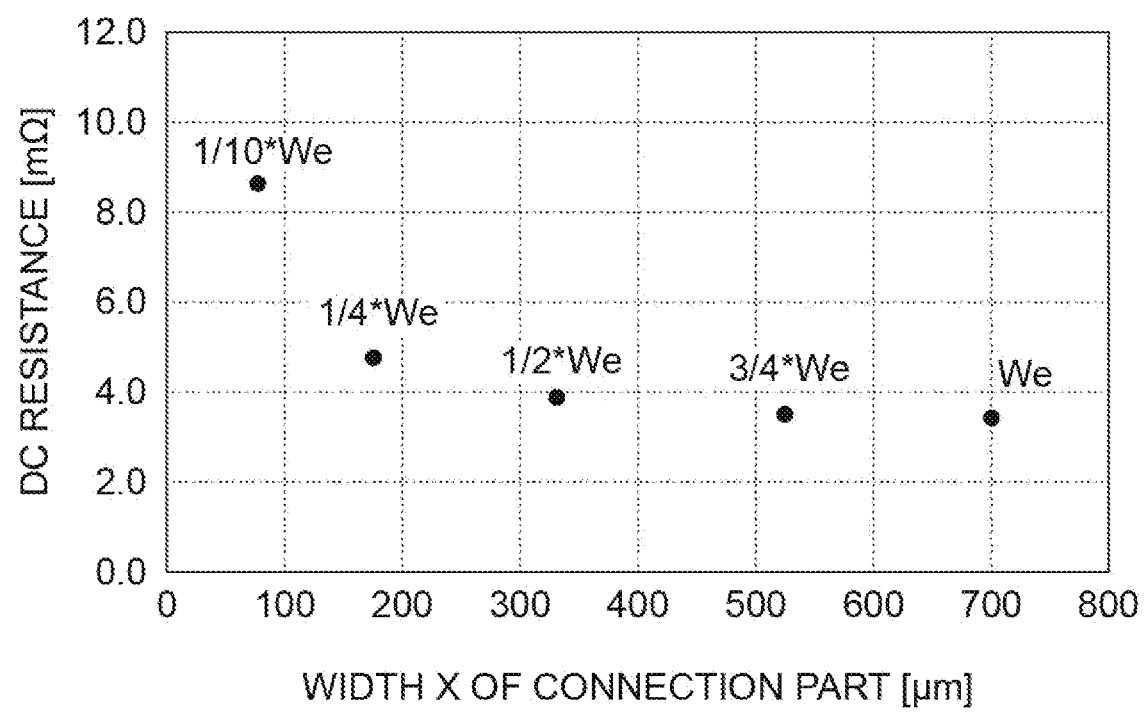
FIG. 9 is a graph showing evaluation test results of a relationship between a width of a connection part and a DC resistance.

FIG. 9 is a graph showing evaluation test results of a relationship between a width of the connection part and a DC resistance. In FIG. 9, the width X [µm] of the connection part is represented on the horizontal axis, and the DC resistance [mΩ] is represented on the vertical axis. As shown in FIG. 9, the DC resistance tends to increase as the width X of the connection part becomes smaller. However, when a width of the connection part is in a range of We to ¼We, a DC resistance value is in a range of about 3.4 mΩ to 4.7 mΩ, and an increase range thereof is relatively small. On the other hand, when the width of the connection part is ⅒We, the DC resistance value is about 8.6 mΩ, and it can be ascertained that the DC resistance is significantly increased compared to the range of We to ¼We. Therefore, it could be confirmed that satisfying We/4≤X contributed to suppressing an increase in DC resistance.

Next, in the present example, evaluation tests on DC resistance and reliability in examples and comparative examples were performed. In the evaluation tests, eight samples of multilayer capacitors of examples 1 to 6 and comparative examples 1 and 2 were prepared, and quality of DC resistance and reliability in each sample was determined.

A threshold value for determining the DC resistance was 5 mΩ. When the DC resistance value was 5 mΩ or lower, it was determined as "satisfactory (O)," and when the DC resistance value was higher than 5 mΩ, it was determined as "poor (x)" Measurement of the DC resistance was performed by a four-terminal measurement method using an ohmmeter. A high-temperature load test was used to determine the reliability. In the high-temperature load test, when decrease in a value of insulation resistance was less than one digit from the initial value, it was determined as "satisfactory (O)," and when decrease in a value of insulation resistance was one digit or more from the initial value, it was determined as "poor (x)." Conditions of the high-temperature load test were a temperature of 125° C., an applied voltage of 4 V, and a test time of 1000 hr.

Examples 1 to 6 all satisfy We/4≤X<W−2×Rw and satisfy Tg>Rt. Examples 1 to 6 all satisfy 175 µm≤X. In all examples 1 to 6, when an area of the end surface including the curved shape is 1, a total area of the connection parts exposed on the end surface is 0.046 or more. The chip size is a 1005 size in example 1, a 1608 size in examples 2 to 4, a 2012 size in example 5, and a 3216 size in example 6. Specific numerical values of parameters in examples 1 to 6 are as illustrated in FIGS. 10A and 10B.

Comparative example 1 satisfies Tg>Rt, but X<We/4. In comparative example 1, when the area of the end surface including the curved shape is 1, the total area of the connection parts exposed on the end surface is less than 0.046. In comparative example 2, Rt>Tg, and furthermore, X>W−2×Rw. In comparative example 2, when the area of the end surface including the curved shape is 1, the total area of the connection parts exposed on the end surface is 0.046 or more. The chip size is 1608 in both comparative examples 1 and 2. Specific numerical values of parameters in comparative examples 1 and 2 are as illustrated in FIGS. 10A and 10B.

As illustrated in FIGS. 10A and 10B, in examples 1 to 6 satisfying We/4≤X<W−2×Rw, results of all the examples satisfied determination criteria for both the DC resistance and the reliability. On the other hand, the DC resistance did not satisfy the determination criteria in comparative example 1 in which X<We/4, and the reliability did not satisfy the determination criteria in comparative example 2 in which X>W−2×Rw. From these results, it could be confirmed that satisfying We/4≤X<W−2×Rw contributed to suppressing an increase in DC resistance and securing the reliability in the multilayer capacitor.

Figure 11:
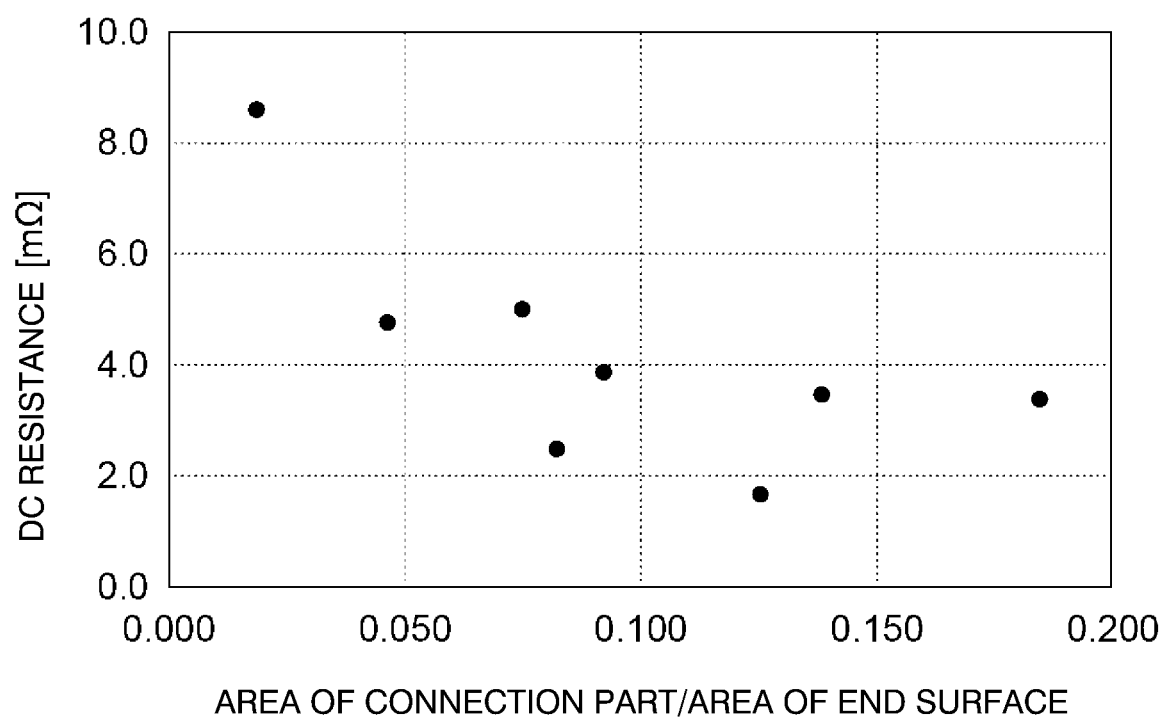
FIG. 11 is a graph showing evaluation test results of a relationship between a ratio of an area of the connection part to an area of the end surface and a DC resistance.

FIG. 11 is a graph showing evaluation test results of a relationship between a ratio of an area of the connection part to an area of the end surface and a DC resistance. In FIG. 11, a total area of the connection parts exposed on the end surface when the area of the end surface including the curved shape is 1 is represented on the horizontal axis, and a DC resistance [mΩ] is represented on the vertical axis. Here, the connection part area/end surface area and the DC resistance value shown in FIG. 10B are plotted for examples 1 to 6 and comparative examples 1 and 2.

As illustrated in FIG. 11, in a range in which the total area of the connection parts exposed on the end surface is 0.046 or more when the area of the end surface including the curved shape is 1, the DC resistance value is suppressed to a range of 1.7 mΩ to 5.0 mΩ. On the other hand, in a range in which the above-described total is less than 0.046 (0.018 here), it is ascertained that the DC resistance value is about 8.6 mΩ, and the DC resistance is significantly increased compared to a case in which the total is 0.046 or more. Therefore, it could be confirmed that setting the above-described total to 0.046 or more contributed to suppressing an increase in DC resistance.

What is claimed is:

1. A multilayer capacitor comprising:
    an element body including a pair of end surfaces facing each other, and a pair of side surfaces and a pair of main surfaces extending in a facing direction of the pair of end surfaces between the pair of end surfaces;
    a plurality of first internal electrodes disposed in a facing direction of the pair of main surfaces in the element body and extending in the facing direction of the pair of end surfaces;
    a plurality of second internal electrodes disposed in the facing direction of the pair of main surfaces in the element body and extending in a facing direction of the pair of side surfaces;
    a pair of first external electrodes disposed on the pair of end surfaces; and
    a pair of second external electrodes disposed apart from the first external electrodes on the pair of side surfaces, wherein
    a ridge line portion of the element body which defines each of the pair of end surfaces has a curved shape,
    the first internal electrodes each include a main electrode part which overlaps each of the second internal electrodes when viewed from the facing direction of the pair of main surfaces, and a connection part which is drawn out from the main electrode part to each of the pair of end surfaces with a width X smaller than a width We of the main electrode part to be connected to each of the first external electrodes, when a width of the element body in the facing direction of the pair of side surfaces is W, and a distance from a start position of a curved shape of the element body on the side surface side in a plane of the first internal electrode of an outermost layer to a virtual surface including the side surface when viewed from the facing direction of the pair of end surfaces is Rw, $We/4 \leq X < W - 2 \times Rw$ is satisfied, and when viewed from the facing direction of the pair of end surfaces, when a distance from a start position of a curved shape of the element body on the main surface side in a plane including edge portions in a width direction of the connection part in the first internal electrode of the outermost layer and perpendicular to the first internal electrode to a virtual surface including the main surface is Rt, and a distance between the first internal electrode of the outermost layer and the main surface is Tg, $Tg > Rt$ is satisfied.

2. The multilayer capacitor according to claim 1, satisfying $175 \ \mu m \leq X$.

3. The multilayer capacitor according to claim 1, having a chip size of a 1608 size.

4. The multilayer capacitor according to claim 1, wherein when an area of the end surface including the curved shape is 1, a total area of the connection parts of the plurality of first internal electrodes exposed on the end surface is 0.046 or more.

5. The multilayer capacitor according to claim 1, wherein a thickness Eg of the connection part is larger than a thickness Ec of the main electrode part in the first internal electrode.

\* \* \* \* \*